United States Patent
Roider et al.

(10) Patent No.: US 9,470,559 B2
(45) Date of Patent: Oct. 18, 2016

(54) OPTICAL LINEAR MEASUREMENT SYSTEM AND METHOD

(71) Applicant: Avago Technologies General IP (Singapore) Pte. Ltd., Singapore (SG)

(72) Inventors: Peter Roider, Regensburg (DE); Markus Stich, Regensburg (DE)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 246 days.

(21) Appl. No.: 14/485,856

(22) Filed: Sep. 15, 2014

(65) Prior Publication Data

US 2016/0076918 A1    Mar. 17, 2016

(51) Int. Cl.
*G01D 5/353* (2006.01)
*G02B 6/43* (2006.01)

(52) U.S. Cl.
CPC ............. *G01D 5/35341* (2013.01); *G02B 6/43* (2013.01)

(58) Field of Classification Search
CPC ..... G01D 5/35341; G01D 5/353; G02B 6/43
USPC .................................................... 250/227.16
See application file for complete search history.

(56) References Cited

U.S. PATENT DOCUMENTS

| | | | |
|---|---|---|---|
| 4,408,495 A | 10/1983 | Couch et al. | |
| 4,922,095 A * | 5/1990 | Gergely | G01D 5/344 250/225 |
| 5,222,165 A * | 6/1993 | Bohlinger | G02B 6/264 250/227.16 |
| 5,321,257 A * | 6/1994 | Danisch | G02B 6/02066 250/227.16 |
| 6,940,062 B2 * | 9/2005 | Kwon | A61B 5/1121 250/227.14 |
| 2013/0039613 A1 | 2/2013 | McNeilly et al. | |

OTHER PUBLICATIONS

Micronor Inc., "Fiber Optic Position Sensor," photonics.com, Micronor Inc., Jun. 3, 2011, 1 page.

* cited by examiner

*Primary Examiner* — Seung C Sohn

(57) ABSTRACT

An optical linear measurement system and method are provided that determine movement of a movable device based on the signal strength of an optical signal propagating in a first optical fiber that is attached to the movable device. As the linear position of the movable device changes, the radius of a coil of the first optical fiber changes. As the radius of the coil changes, the strength of the optical signal changes. A second static optical fiber is used for performing temperature compensation. Changes in signal strength of an optical signal carried on the second optical fiber due to temperature are used to adjust the measured strength of the signal carried on the first optical fiber. The movement of the movable device is then made based on the adjusted signal strength measurement.

20 Claims, 6 Drawing Sheets

OPTICAL LINEAR MEASUREMENT SYSTEM AND METHOD

TECHNICAL FIELD

The invention relates to optical linear measurement systems, and more particularly, to an optical linear measurement system that determines linear movement based on measured optical loss.

BACKGROUND

Linear measurement systems are used to determine linear movement of a movable device based on measured values obtained from some type of sensor. The values that are output from the sensor vary with linear movement of the movable device. The linear movement of the movable device is then calculated from the output values of the sensor. Linear measurement systems are commonly referred to as linear encoders.

Various types of linear encoders are used today including magnetic, optical, inductive, and capacitive linear encoders. Linear encoders are used in a variety of technologies including, for example, robotics systems, pick-and-place printed circuit board (PCB) systems, machine tools, semiconductor handling equipment, semiconductor test equipment, wire bonding systems, printers, laser scanners, coordinate-measuring machines, calipers, and tension testing equipment.

Optical linear encoders generally include a light source, a light sensor, a stationary scale, a controller, and other electrical circuitry. The light sensor is typically mechanically coupled to the movable device such that the sensor moves relative to the stationary scale as the movable device moves. The scale has reference marks or some other indicia on it that encodes position. The light source projects light onto the scale and the light sensor receives light reflected from the scale and generates electrical signals based on the received light. The electrical signals are converted into digital values by analog-to-digital conversion circuitry and then processed by the controller to decode the position of the movable device relative to the scale.

Although a variety of optical linear encoders are available in the market, existing optical linear encoders are relatively complex in design and expensive to manufacture. A need exists for an optical linear encoder that is relatively simple in design and relatively inexpensive to manufacture.

SUMMARY

The invention is directed to a system for measuring movement of a movable device and a method. The system comprises at least a first electrical-to-optical converter (EOC), a first optical-to-electrical converter (OEC), a first optical fiber, and processing circuitry. The first EOC converts an electrical signal into a first optical signal, which is then optically coupled into a first end of the first optical fiber, which is arranged in a coil. At least one location on the first optical fiber is mechanically coupled to the movable device such that movement of the movable device imparts movement in the first optical fiber that produces a change in a radius of the coil. The first optical signal propagates along the first optical fiber and passes out of a second end of the first optical fiber. The first OEC receives the first optical signal passing out of the second end of the first optical fiber and converts it into a first output electrical signal. The processing circuitry receives and processes the first output electrical signal to determine the signal strength of the first optical signal. The processing circuitry adjusts the determined signal strength to compensate for temperature and determines an amount of movement of the movable device based on the adjusted signal strength.

In accordance with an embodiment, the method comprises the following: with a first EOC, converting an electrical signal into a first optical signal; optically coupling the first optical signal into a first end of a first optical fiber that is arranged in a coil with at least one location on the first optical fiber mechanically coupled to the movable device; with a first OEC, receiving the first optical signal passing out of the second end of the first optical fiber and converting the received first optical signal into a first output electrical signal; and with processing circuitry, processing the first output electrical signal to determine a signal strength of the first optical signal, adjusting the determined signal strength to compensate for temperature, and determining an amount of movement of the movable device based on the adjusted signal strength.

In accordance with another illustrative embodiment, the system comprises first and second EOCs, first and second optical fiber, first and second OECs, and processing circuitry. The first and second EOCs convert respective electrical signals into first and second optical signals that are coupled into first ends of the first and second optical fibers, respectively. The first optical fiber is arranged in a coil. At least one location on the first optical fiber is mechanically coupled to the movable device such that movement of the movable device imparts movement in the first optical fiber that produces a change in a radius of the coil. The second optical fiber is stationary such that movement of the movable device imparts no movement in the second optical fiber. The first and second optical signals propagate along the first and second optical fibers and pass out of the second ends of the first and second optical fibers, respectively. The first and second OECs convert the first and second optical signals passing out of the ends of the first and second optical fibers into first and second output electrical signals, respectively. The processing circuitry processes the first output electrical signal to determine the signal strength of the first optical signal. The processing circuitry adjusts the determined signal strength of the first optical signal to compensate for temperature based on the second electrical output signal and determines an amount of movement of the movable device based on the adjusted signal strength.

These and other features and advantages of the invention will become apparent from the following description, drawings and claims.

DETAILED DESCRIPTION OF ILLUSTRATIVE EMBODIMENTS

Figure 1A:
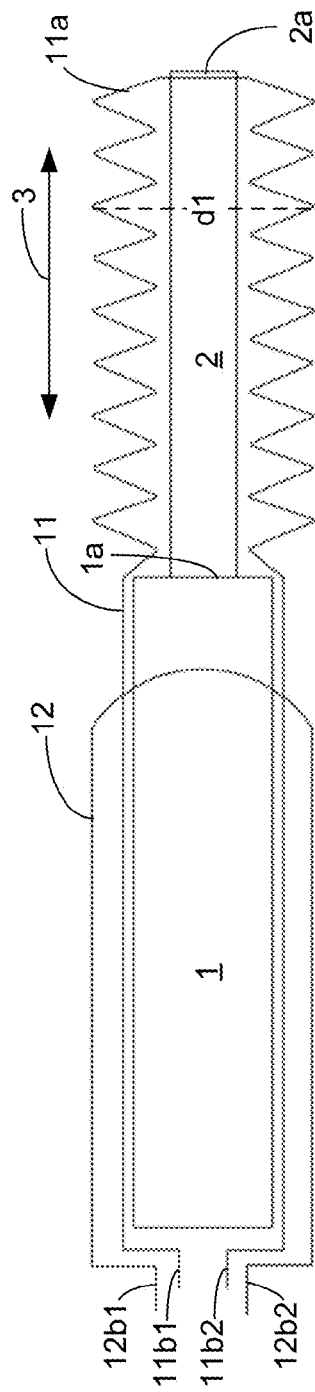
FIGS. 1A and 1B illustrate a linear actuator having a shaft that is movable in a linear direction from a fully-retracted position shown in FIG. 1A to a fully-extended position shown in FIG. 1B.

In accordance with illustrative embodiments described herein, an optical linear measurement system and method are provided that determine linear movement or position of a movable device based on the signal strength of an optical signal propagating in a first optical fiber that is mechanically coupled to the movable device. As the position of the movable device changes, the radius of a meander, or coil, of the first optical fiber changes. As the radius of the meander of the first optical fiber changes, the strength of the optical signal changes. The signal strength is measured. A second optical fiber that is static is used for performing temperature compensation. A change in the strength of an optical signal carried on the second optical fiber due to temperature is measured and used to adjust the measurement of the strength of the signal carried on the first optical fiber in order to compensate for changes in temperature. The linear movement or position of the movable device is then made based on the adjusted signal strength measurement.

While systems are known that determine vibration or motion of an object based on measured signal loss of an optical signal propagating in a coiled optical fiber caused by changes in the radius of the coiled optical fiber, such systems do not compensate for changes in temperature. For example, U.S. Pat. No. 4,408,495 discloses such a system. In accordance with the exemplary embodiments of the invention, however, it has been determined that the temperature of the environment surrounding the measurement fiber produces an artifact that overrides the change in signal strength attributed to the motion of the movable device. It has also been determined that accurate measurement results cannot be obtained without removing this artifact. As indicated above, the present invention uses a second, static optical fiber to determine the effect that temperature has on signal strength and then performs temperature compensation on the signal strength measurement value of the optical signal that is output from the first optical fiber. In this way, the determination of the amount and direction of movement of the movable device is not affected by temperature. Illustrative, or exemplary, embodiments of the system and method will now be described with reference to FIGS. 1A-6, in which like reference numerals represent like elements, features or components. It should be noted that elements, features or components in the figures are not drawn to scale.

Figure 1B:
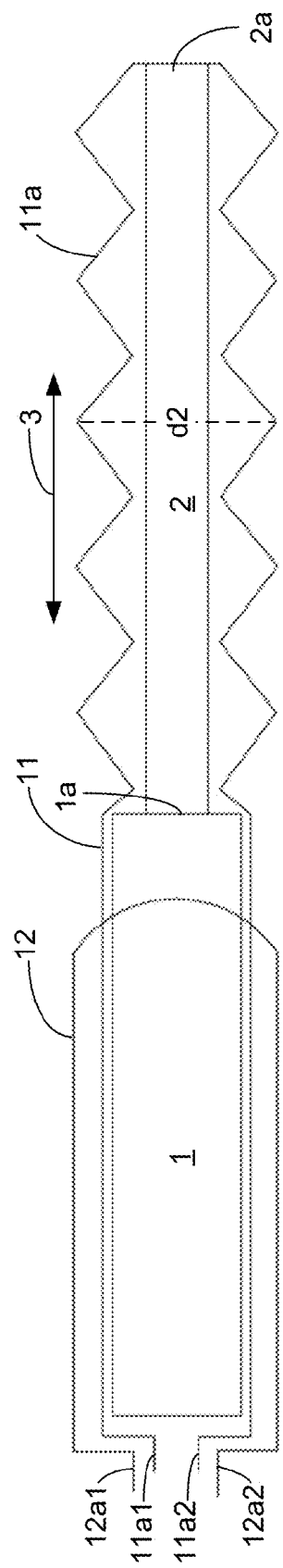
Figure 2:
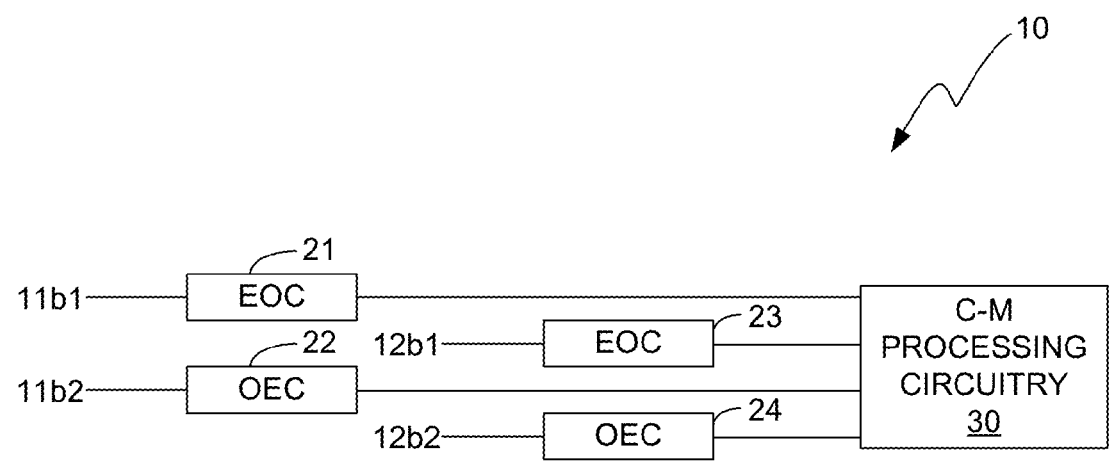
FIG. 2 illustrates a block diagram of an optical linear measurement circuit in accordance with an illustrative embodiment that measures the amount and direction of movement of the shaft of the linear actuator shown in FIGS. 1A and 1B.

FIGS. 1A and 1B illustrate a linear actuator 1 having a shaft 2 that is movable in a linear direction indicated by double-headed arrow 3 from a fully-retracted position shown in FIG. 1A to a fully-extended position shown in FIG. 1B. FIG. 2 illustrates a block diagram of an optical linear measurement circuit 10 in accordance with an illustrative embodiment that measures the amount and direction of movement of the shaft 2 of the linear actuator shown in FIGS. 1A and 1B. An optical linear measurement system in accordance with an illustrative, or exemplary, embodiment includes the actuator 1, the circuit 10 and first and second optical fibers 11 and 12. The measurement circuit 10 includes first and second electrical-to-optical converters (EOCs) 21 and 23, respectively, first and second optical-to-electrical converters (OECs) 22 and 24, respectively, and control and measurement (C-M) processing circuitry 30.

The first fiber 11 is a motion-sensing fiber and the second fiber 12 is a temperature-compensation fiber. The motion-sensing fiber 11 is arranged in a meander, or coil, 11a that is mechanically coupled to, or attached to, the shaft 2 in a way that causes the radius of the coil 11a to change as the distance between a front end 1a of the actuator 1 and a distal end 2a of the shaft 2 changes. In other words, the radius of the coil 11a changes as the length of the exposed portion of the shaft 2 (i.e., the portion that is outside of the housing of the actuator 1) changes. This change in radius is demonstrated by comparing FIGS. 1A and 1B. In FIG. 1A, the shaft 2 is in a first position in which the distal end 2a of the shaft 2 is a first distance from the front end 1a of the actuator 1. In FIG. 1B, the shaft 2 is in a second position in which the distal end 2a of the shaft 2 is a second distance from the front end 1a of the actuator 1, where the second distance is greater than the first distance. A proximal end of the shaft 2 is inside of the actuator 1 and is therefore not visible.

When the shaft 2 is in the first position shown in FIG. 1A, the coil 11a has a first diameter, d1. When the shaft 2 is in the second position shown in FIG. 1B, the coil 11a has a second diameter, d2, that is less than d1. Thus, it can be seen that as the distance between the distal end 2a of the shaft 2 and the front end 1a of the actuator 1 increases, the diameter of the coil 11a decreases, and vice versa. The radius, r1, of the coil 11a when the shaft 2 is in the first position shown in FIG. 1A is equal to ½d1. The radius, r2, of the coil 11a when the shaft 2 is in the second position shown in FIG. 1B is equal to ½d2.

Figure 3B:
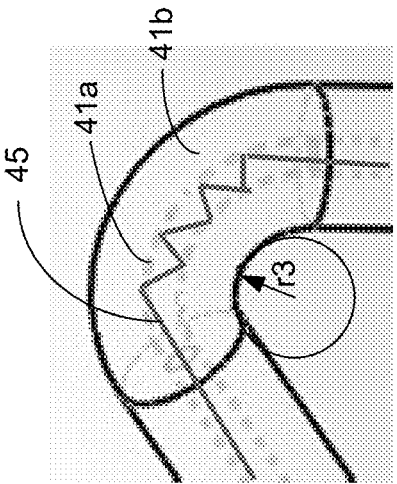
FIG. 3B shows an expanded view of the bent portion of the fiber shown in FIG. 3A that is within dashed circle shown in FIG. 3A.
Figure 3A:
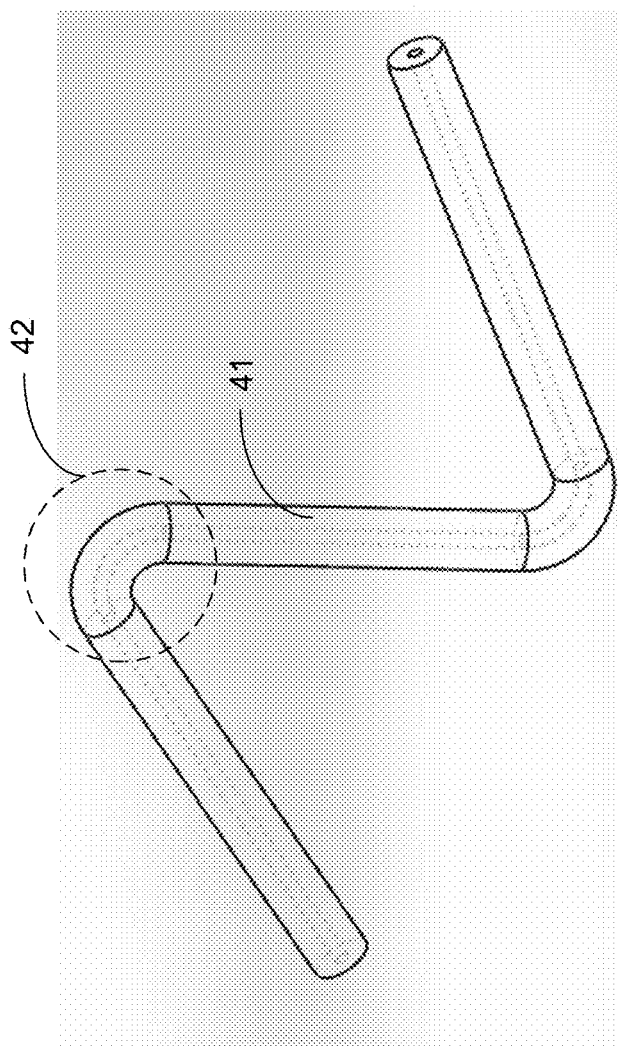
FIG. 3A shows a portion of optical fiber having a bend in it of radius r3 that causes the optical signal propagating therein to be attenuated.
Figure 4B:
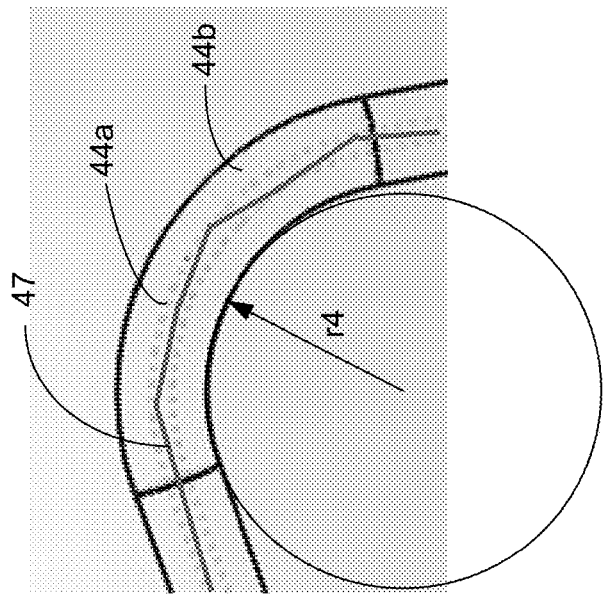
FIG. 4B shows an expanded view of the bent portion of the fiber shown in FIG. 4A that is within the dashed circle shown in FIG. 4A.
Figure 4A:
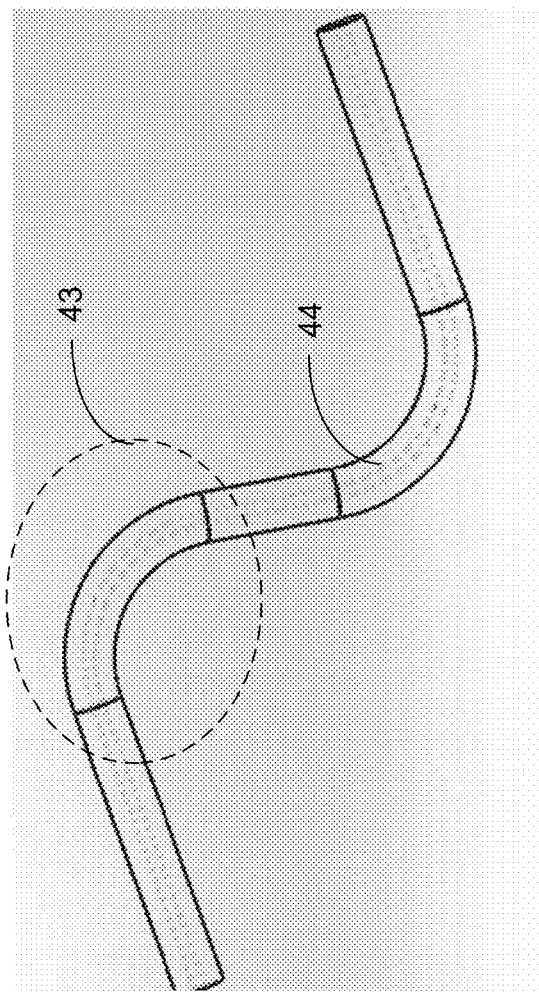
FIG. 4A shows a portion of optical fiber having a bend in it that has a radius r4 that is greater than the radius r3 of the bend in the optical fiber shown in FIG. 3A.

FIGS. 3A-4B illustrate portions of optical fibers and the manner in which a change in the bend radius of the fibers affects the strength of the optical signals propagating in the optical fibers. FIG. 3A shows a portion of optical fiber 41 having a bend in it of radius r3 that causes the optical signal propagating therein to be attenuated. FIG. 3B shows an expanded view of the bent portion of the fiber 41 with radius r3 that is within dashed circle 42 shown in FIG. 3A. FIG. 4A shows a portion of optical fiber 44 having a bend in it that has a radius r4 that is greater than the radius r3 of the bend in the optical fiber 41 shown in FIG. 3A. FIG. 4B shows an expanded view of the bent portion of the fiber 44 of radius r4 that is within the dashed circle 43 shown in FIG. 4A.

As is known, the strength of an optical signal propagating in an optical fiber of a coil is attenuated as the radius of the coil decreases. In FIG. 3B, an optical signal 45 is reflected several times at the interface of a core 41a of the fiber 41 and a coating 41b of the fiber 41. Likewise, in FIG. 4B, an optical signal 47 is reflected at the interface of a core 44a of the fiber 44 and a coating 44b of the fiber 44. However, due to r3 being smaller than r4, the optical signal 45 is reflected a greater number of times at the interface than the number of times that the optical signal 47 is reflected at the interface. In addition, the angle of incidence of the optical signal 45 at the interface is much greater than the angle of incidence of the optical signal 47 at the interface. For these reasons, the amount of light that passes out of the core 41a into the coating 41b is greater than the amount of light that passes out of the core 44a into the coating 44b.

The present invention makes use of this known relationship between bend radius and signal loss to determine the linear position of the shaft 2. However, the present invention also makes use of the observation discussed above regarding the affect that temperature can have on signal strength in an optical fiber. The linear position measurement algorithm determines the linear position of the shaft 2 based on a signal strength measurement that has been adjusted to compensate for temperature, as will be described below with reference to FIGS. 5 and 6.

With reference again to FIGS. 1A-2, first and second ends 11$b$1 and 11$b$2 of fiber 11 are connected to EOC 21 and OEC 22, respectively. First and second ends 12$b$1 and 12$b$2 of fiber 12 are connected to EOC 23 and OEC 24, respectively. EOCs 21 and 23 may be any suitable light sources, including, for example, light emitting diodes (LEDs) or laser diodes. OECs 22 and 24 may be any suitable light detectors, including, for example, P-intrinsic-N (PIN) diodes, or photodiodes. The C-M processing circuitry 30 includes driver circuitry (not shown) for driving the EOCs 21 and 23 to cause them to produce respective optical signals. The ends 11$b$1 and 12$b$1 of the optical fibers 11 and 12 may be directly attached (e.g., pig tailed) to the EOCs 21 and 23, attached by respective optical connectors (not shown) disposed on their ends to the EOCs 21 and 23, or placed in close proximity to the EOCs 21 and 23 and optically coupled therewith by some type of optics system (not shown). The invention is not limited with respect to the arrangement that is used to attach, connect, or optically couple the ends 11$b$1 and 12$b$1 to the EOCs 21 and 23, respectively.

The optical signals produced by the EOCs 21 and 23 are optically coupled into the ends 11$b$1 and 12$b$1 of the optical fibers 11 and 12, respectively. The optical signals passing out of the ends 11$b$2 and 12$b$2 of the fibers 11 and 12 are received by the OECs 22 and 24, respectively, which convert the respective optical signals into respective electrical signals. The C-M processing circuitry 30 then processes the electrical signals in either the analog or digital domains to determine the linear position of the shaft 2. The C-M processing circuitry 30 uses the electrical signal output from the OEC 22 to determine the position of the shaft 2. The C-M processing circuitry 30 uses the electrical signal output from the OEC 24 to determine an adjustment that is to be made to the calculation of the position of the shaft 2 to perform temperature compensation. The electrical signal output from OEC 22 will have a value that is based on the amount of attenuation of the optical signal propagating in fiber 11, which is relatable to a change in the linear position of the end 2$a$ of the shaft 2, or the stroke length of the shaft 2. The electrical signal output from OEC 24 will have a value that is based on the amount of attenuation of the optical signal propagating in fiber 12, which is relatable to the temperature of the fiber 12.

Prior to performing normal operations in the linear measurement system, a calibration algorithm is performed to determine the correlation between the stroke length (i.e., linear position) of the shaft 2 and the strength of the optical signal carried on fiber 11. The calibration algorithm also determines offsets that are to be made to those signal strength measurements in order to compensate for temperature. During the calibration algorithm, the shaft 2 is moved over its operating range of linear motion while the corresponding signal strength values output from the OEC 22 are measured. A first table that associates these signal strength values with the corresponding stroke lengths is recorded in a memory device (not shown), which may be part of the C-M processing circuitry 30. The electrical signals output from the OEC 24 corresponding to changes in the strength of the optical signals carried on fiber 12 are also measured while subjecting the fiber 12 to the range of temperatures that are possible during normal operations. A second table that associates the measured signal strength values with the corresponding temperature values is recorded in the memory device.

During normal operations, the C-M processing circuitry performs a linear position measurement algorithm that processes the electrical signals that are outputted from OEC 22 in real-time to determine the linear position of the shaft 2. The C-M processing circuitry 30 converts the electrical signals output from OEC 22 into digital values. The temperature to which the fibers 11 and 12 are currently being subjected is also measured and delivered to the C-M processing circuitry 30. The temperature measurement may be made prior to or during normal operations. The measured temperature is used by the linear position measurement algorithm to obtain an associated signal strength offset value from the second table. The linear position measurement algorithm adjusts the measured signal strength value by the associated signal strength offset value obtained from the second table to produce an adjusted signal strength value. The algorithm then compares the adjusted signal strength value to the signal strength values stored in the first table to determine the closest-matching value in the first table. The algorithm then selects the linear position value in the first table that is associated with the closest-matching signal strength value as the actual linear position of the shaft 2. The first table may be, for example, a look-up table (LUT), and the adjusted signal strength value may be used as an index to address the LUT. The second table may also be a LUT, in which case the measured temperature value is used as an index to address the LUT.

Figure 5:
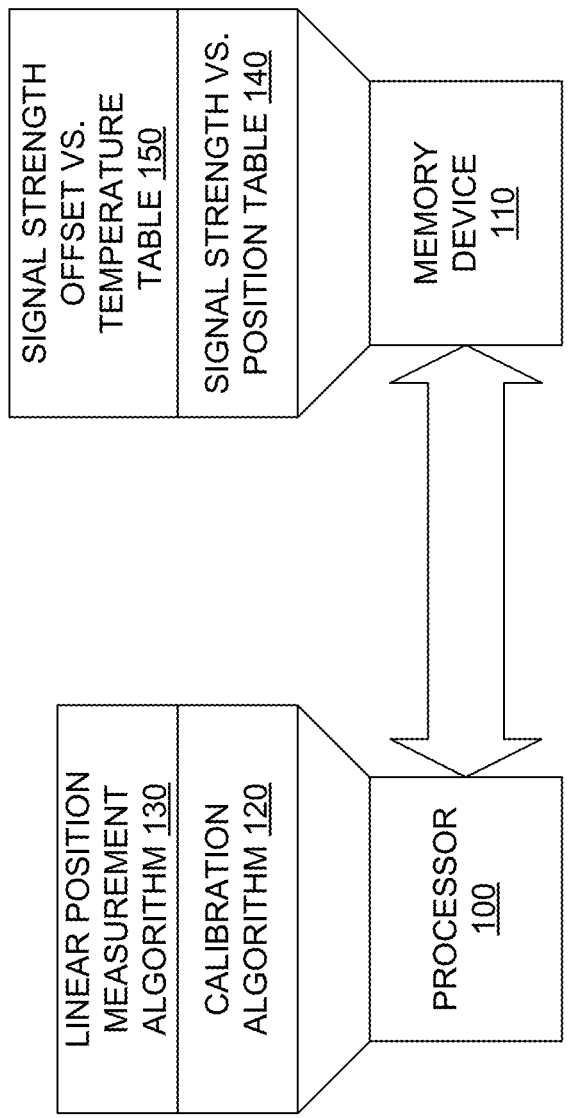
FIG. 5 illustrates a block diagram of the C-M processing circuitry shown in FIG. 2 in accordance with an illustrative embodiment.

FIG. 5 illustrates a block diagram of the C-M processing circuitry 30 shown in FIG. 2 in accordance with an illustrative embodiment. In accordance with this illustrative embodiment, the C-M processing circuitry 30 includes at least one processor 100 and at least one memory device 110. The processor 100 may be, for example, a microprocessor, a microcontroller, an application specific integrated circuit (ASIC), a programmable gate array (PGA), a programmable logic array (PLA), or any other suitable processing device capable of performing the calibration and linear measurement algorithms 120 and 130, respectively. The memory device 110 may be any suitable memory device, such as, for example, random access memory (RAM), read only memory (ROM), flash memory, etc.

As indicated above, prior to performing normal operations in the linear measurement system, the calibration algorithm 120 described above correlates the stroke length, or linear position, of the shaft 2 with the strength of the optical signal carried on fiber 11. The calibration algorithm 120 also determines signal strength offsets that are to be made to the signal strength measurements in order to compensate for temperature. The calibration algorithm 120 uses this measured information to generate the aforementioned first and second tables and stores them in memory device 110. In FIG. 5, the signal strength versus (vs.) position table 140 corresponds to the first table and the signal strength offset vs. temperature table 150 corresponds to the second table.

During normal operations, the linear position measurement algorithm 130 uses the temperature to which the fibers 11 and 12 are subjected during normal operations to obtain an associated signal strength offset value from table 150. As the linear position measurement algorithm 130 measures the signal strength values corresponding to the optical signal propagating on fiber 11, the algorithm 130 adjusts the measured signal strength values by the signal strength offset value obtained from the second table to obtain adjusted signal strength values. The linear position measurement algorithm 130 then selects the linear position values in table 140 that correspond to the respective adjusted signal strength values as the respective actual linear position values of the shaft 2. Thus, table 140 acts as a scale that encodes linear position as a function of signal strength with temperature compensation.

It should be noted that the calibration and linear position measurement algorithms 120 and 130 can be performed in a variety of ways and that the description provided above is only an illustrative embodiment of these algorithms. For example, in some cases, it may be possible to calculate the signal strength offsets for temperature compensation on the fly in real-time and to adjust the measured signal strength values by the offset in real-time as the optical signals carried on fiber 11 are measured. This would eliminate the need for table 150 and would allow a single look up in table 140 to be performed to convert the adjusted signal strength value into a linear position value.

Figure 6:
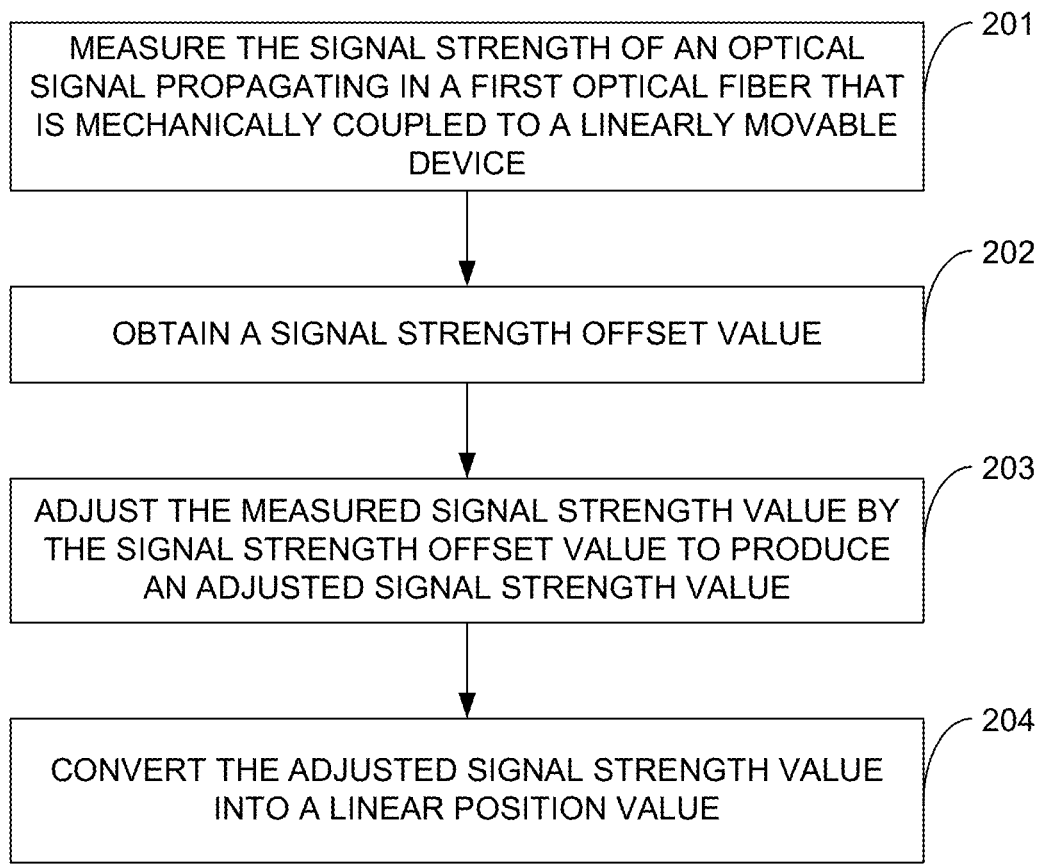
FIG. 6 illustrates a flow diagram that represents a linear position measurement method in accordance with an illustrative embodiment for measuring the linear position of a linearly movable device.

FIG. 6 illustrates a flow diagram that represents the linear position measurement method in accordance with an illustrative embodiment for measuring the linear position of a linearly movable device. The strength of an optical signal propagating in a first optical fiber that is mechanically coupled to the movable device is measured, as indicated by block 201. A signal strength offset value is obtained by evaluating the effect of temperature on the strength of an optical signal propagating in a second optical fiber that is static and in the same environment as the first optical fiber, as indicated by block 202. The measured strength of the optical signal propagating in the first optical fiber is adjusted by the signal strength offset value to obtain an adjusted signal strength value, as indicated by block 203. The adjusted signal strength value is then converted into a linear position value, as indicated by block 204.

The step represented by block 202 is typically performed in the manner described above by evaluating changes in the signal strength of an optical signal propagating in a second, static optical fiber over a range of temperatures to determine the proper signal strength offset values to be used for the different temperatures. It should be noted that this step is typically performed offline during a calibration algorithm of the type described above with reference to FIG. 5. The step represented by block 204 is typically performed in the manner described above by using the adjusted signal strength value obtained in step 203 as an index to a table that contains the linear position values. As indicated above, these tasks can be performed in a variety of ways, as will be understood by persons of skill in the art in view of the description provided herein.

The algorithms described above are typically implemented in software or firmware running on a processor. Such software or firmware is typically stored on a non-transitory computer-readable medium, such as, for example, the memory device 110 shown in FIG. 5. All or portions of these algorithms could be performed in hardware or in a combination of hardware and software or firmware.

It should be noted that embodiments have been described herein for the purpose of demonstrating the principles and concepts of the invention. As will be understood by persons skilled in the art in view of the description being provided herein, the invention is not limited to these embodiments. For example, the optical linear position measurement system, algorithms and method have been described with reference to exemplary embodiments, but many variations may be made to these embodiments within the scope of the invention. Also, while the system, algorithms and method have been described with reference to determining linear motion or position, the principles and concepts may be used to determine other types of motion or position, such as angular motion or position, for example. Also, the principles and concepts of the invention may also be applied in other areas of technology, such as in strain gauges and vibration sensing systems. Persons of skill in the art will understand that these and other modifications may be made to the embodiments described herein without deviating from the principles and concepts of the invention and that all such modifications are within the scope of the invention.

What is claimed is:

1. A system for measuring movement of a movable device, the system comprising:
    a first electrical-to-optical converter (EOC) for converting an electrical signal into a first optical signal;
    a first optical fiber having first and second ends, the first optical fiber being arranged in a coil, at least one location on the first optical fiber being mechanically coupled to the movable device such that movement of the movable device imparts movement in the first optical fiber that produces a change in a radius of the coil, the first end receiving the first optical signal from the first EOC, and wherein the first optical signal is received in the first end of the first optical fiber, propagates along the first optical fiber and passes out of the second end of the first optical fiber;
    a first optical-to-electrical converter (OEC) for receiving the first optical signal passing out of the second end of the first optical fiber and converting the received first optical signal into a first output electrical signal; and
    processing circuitry that receives and processes the first output electrical signal to determine a signal strength of the first optical signal, and wherein the processing circuitry adjusts the determined signal strength to compensate for temperature and determines an amount of movement of the movable device based on the adjusted signal strength.

2. The system of claim 1, wherein the processing circuitry determines linear movement of the movable device based on the adjusted signal strength.

3. The system of claim 2, wherein the processing circuitry also determines a direction of movement of the movable device based on the adjusted signal strength.

4. The system of claim 1, wherein the processing circuitry also determines a position of the movable device based on the adjusted signal strength.

5. The system of claim 1, wherein the signal strength of the first optical signal changes based on the change in the radius of the coil.

6. The system of claim 1, wherein the movable device is a shaft of a linear actuator, wherein the shaft moves in linear directions between a fully-retracted position of the shaft and a fully-extended position of the shaft.

7. The system of claim 1, wherein the processing circuitry includes a processor and a memory device, wherein the processor performs a linear position measurement algorithm that processes a digital signal corresponding to a digitized version of the first output electrical signal of the first OEC to determine the signal strength of the first optical signal, and wherein the memory device stores at least a first table of data relating different amounts of linear movement of the movable device to different digital values of the first output electrical signal, and wherein the processor performing the algorithm adjusts the digitized version of the first output electrical signal to compensate for temperature and then selects a stored linear movement value from the first table that corresponds to a match between the adjusted digitized version of the first output electrical signal and one of the digital values of the first output electrical signal contained in the first table.

8. The system of claim 7, wherein the memory device has a second table therein having temperature compensation adjustment values, and wherein the processor performing the linear position measurement algorithm selects one of the stored temperature compensation adjustment values based on a current temperature of the optical fiber coil and adjusts the digitized version of the first output electrical signal by the selected temperature compensation adjustment values to produce the adjusted digitized version of the first output electrical signal.

9. The system of claim 1, further comprising:
a second EOC for converting an electrical signal into a second optical signal;
a second optical fiber having first and second ends, the second optical fiber being stationary such that movement of the movable device imparts no movement in the second optical fiber, the first end of the second optical fiber receiving the second optical signal from the second EOC, and wherein the second optical signal is received in the first end of the second optical fiber, propagates along the second optical fiber and passes out of the second end of the second optical fiber; and
a second OEC for receiving the second optical signal passing out of the second end of the second optical fiber and converting the received second optical signal into a second output electrical signal, and wherein the processing circuitry that receives and processes the second output electrical signal to determine a signal strength of the second optical signal, and wherein the processing circuitry uses the determined strength of the second optical signal to determine the adjustment that is to be made to the determined signal strength of the first output electrical signal to compensate for temperature.

10. A method for measuring movement of a movable device, the method comprising:
with a first electrical-to-optical converter (EOC), converting an electrical signal into a first optical signal;
optically coupling the first optical signal into a first end of the first optical fiber, the first optical fiber being arranged in a coil, at least one location on the first optical fiber being mechanically coupled to the movable device such that movement of the movable device imparts movement in the first optical fiber that produces a change in a radius of the coil, and wherein the first optical signal propagates along the first optical fiber and passes out of the second end of the first optical fiber;
with a first optical-to-electrical converter (OEC), receiving the first optical signal passing out of the second end of the first optical fiber and converting the received first optical signal into a first output electrical signal; and
with processing circuitry, processing the first output electrical signal to determine a signal strength of the first optical signal;
with the processing circuitry, adjusting the determined signal strength to compensate for temperature; and with the processing circuitry, determining an amount of movement of the movable device based on the adjusted signal strength.

11. The method of claim 10, wherein the movement of the movable device that is determined by the processing circuitry is linear movement.

12. The method of claim 11, further comprising:
with the processing circuitry, determining a direction of movement of the movable device based on the adjusted signal strength.

13. The method of claim 10, further comprising:
with the processing circuitry, determining a position of the movable device based on the adjusted signal strength.

14. The method of claim 10, wherein the signal strength of the first optical signal changes based on the change in the radius of the coil.

15. The method of claim 10, wherein the movable device is a shaft of a linear actuator, wherein the shaft moves in linear directions between a fully-retracted position of the shaft and a fully-extended position of the shaft.

16. The method of claim 10, wherein the step of determining an amount of movement of the movable device based on the adjusted signal strength comprises:
with a processor of the processing circuitry, accessing a memory device having a first table stored therein of data relating different amounts of linear movement of the movable device to different digital values of the first output electrical signal; and
with the processor, selecting a stored linear movement value from the first table that corresponds to a match between a digital version of the first output electrical signal that has been adjusted to compensate for temperature and one of the digital values of the first output electrical signal contained in the first table.

17. The method of claim 16, wherein the memory device stores temperature compensation adjustment values in a second table, and wherein the step of adjusting the determined signal strength to compensate for temperature comprises:
with the processor, selecting one of the stored temperature compensation adjustment values from the second table based on a current temperature of the coil; and
with the processor, adjusting the determined signal strength of the first optical signal by the temperature compensation adjustment value selected from the second table to obtain the adjusted signal strength value that is used by the processor to determine the movement of the movable device.

18. The method of claim 10, further comprising:
with a second EOC, converting an electrical signal into a second optical signal;
optically coupling the second optical fiber into a first end of a second optical fiber, the second optical fiber being stationary such that movement of the movable device imparts no movement in the second optical fiber, and wherein the second optical signal propagates along the second optical fiber and passes out of the second end of the second optical fiber;
with a second OEC, receiving the second optical signal passing out of the second end of the second optical fiber and converting the received second optical signal into a second output electrical signal; and
with the processing circuitry, processing the second output electrical signal to determine a signal strength of the second optical signal; and
with the processing circuitry, using the determined strength of the second optical signal to determine the adjustment that is to be made to the determined signal strength of the first optical signal to compensate for temperature.

19. The method of claim 18, wherein the memory device stores temperature compensation adjustment values in a second table, and wherein the step of adjusting the determined signal strength to compensate for temperature comprises:

with the processing circuitry, selecting one of the stored temperature compensation adjustment values from the second table based on a current temperature of the coil; and with the processing circuitry, adjusting the determined signal strength of the first optical signal by the temperature compensation adjustment value selected from the second table to obtain the adjusted signal strength value that is used by the processor to determine the movement of the movable device.

20. A system for measuring movement of a movable device, the system comprising:

first and second electrical-to-optical converters (EOCs) for converting respective electrical signals into first and second optical signals;

first and second optical fibers having first and second ends, the first optical fiber being arranged in a coil, at least one location on the first optical fiber being mechanically coupled to the movable device such that movement of the movable device imparts movement in the first optical fiber that produces a change in a radius of the coil, the second optical fiber being stationary such that movement of the movable device imparts no movement in the second optical fiber, the first ends of the first and second optical fibers receiving the first and second optical signals from the first and second EOCs, respectively, and wherein the first and second optical signals propagate along the first and second optical fibers and pass out of the second ends of the first and second optical fibers, respectively;

first and second optical-to-electrical converters (OECs) for receiving the first and second optical signals passing out of the first and second ends of the first and second optical fibers, respectively, and converting the received first and second optical signals into first and second output electrical signals, respectively; and processing circuitry that receives the first and second electrical output signals, wherein the processing circuitry processes the first output electrical signal to determine a signal strength of the first optical signal, and wherein the processing circuitry adjusts the determined signal strength of the first optical signal to compensate for temperature based on the second electrical output signal and determines an amount of movement of the movable device based on the adjusted signal strength.

* * * * *